(12) United States Patent
Hill et al.

(10) Patent No.: US 8,810,873 B2
(45) Date of Patent: Aug. 19, 2014

(54) SCANNER ASSEMBLY

(75) Inventors: Edward A. Hill, Oceanside, CA (US); Stephan W. Emmenegger, San Diego, CA (US); David M. Lovelace, San Diego, CA (US); Ryan M. Smith, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 510 days.

(21) Appl. No.: 13/050,369

(22) Filed: Mar. 17, 2011

(65) Prior Publication Data

US 2012/0236371 A1    Sep. 20, 2012

(51) Int. Cl.
*H04N 1/04* (2006.01)
*H04N 1/10* (2006.01)

(52) U.S. Cl.
CPC ........... *H04N 1/1026* (2013.01); *H04N 1/1035* (2013.01); *H04N 2201/0446* (2013.01); *H04N 2201/0442* (2013.01)
USPC ............ 358/497; 358/474; 358/482; 358/483

(58) Field of Classification Search
CPC ... H04N 1/193; H04N 1/1017; H04N 1/1013; H04N 2201/1016; H04N 2201/0425; H04N 1/40056; H04N 1/03; H04N 3/1581; H04N 2201/03138
See application file for complete search history.

(56) References Cited

U.S. PATENT DOCUMENTS

| | | | | |
|---|---|---|---|---|
| 6,091,516 A * | 7/2000 | Chang et al. | ................... | 358/474 |
| 6,888,651 B2 * | 5/2005 | Lee | ................... | 358/497 |
| 7,126,728 B2 * | 10/2006 | Tseng et al. | ................... | 358/497 |
| 7,158,270 B2 * | 1/2007 | Sheng et al. | ................... | 358/497 |
| 7,385,736 B2 * | 6/2008 | Tseng et al. | ................... | 358/497 |
| 7,486,423 B2 * | 2/2009 | Chang et al. | ................... | 358/497 |
| 7,768,679 B2 * | 8/2010 | Yamaguchi | ................... | 358/497 |

* cited by examiner

*Primary Examiner* — Cheukfan Lee

(57) ABSTRACT

A scanner assembly comprising the following components. A scan module having a first surface and configured to receive an image oriented along the first surface. A carriage having a thickness no thicker than a thickness of the scan module perpendicular to the first surface, the carriage configured to receive the scan module and to move the scan module in a direction of travel. A v-bearing coupled to the carriage proximate to one end of the carriage and protruding from the carriage in a direction perpendicular to the first surface. A scan base having a groove and configured to receive the v-bearing. A belt drive configured to move the v-bearing in the groove of the scan base.

20 Claims, 3 Drawing Sheets

SCANNER ASSEMBLY

FIELD

Embodiments of the present invention relate generally to a scanner assembly.

BACKGROUND

Modern trends demand that technology become increasingly smaller. This demand extends to scanners including a desire to make a scanner assembly as thin as possible. Most scanner assemblies include a scan module that must move along a transparent surface. A drive system is used to move the scan module relative to a base. One such drive system employs a rod and bronze bearing attached to the base and an apparatus that moves the scan module along the rod. Such a drive system requires expensive metallic materials and adds bulk to the overall scanner assembly. Additionally, the transparent surface of the scanner assembly may not be completely flat and has small amounts of warping or curvature in it. Such a curvature can lead to errors in position of the scan module, which ideally maintains a uniform distance from a document or object that is placed on the transparent surface to be scanned.

Figure 1:
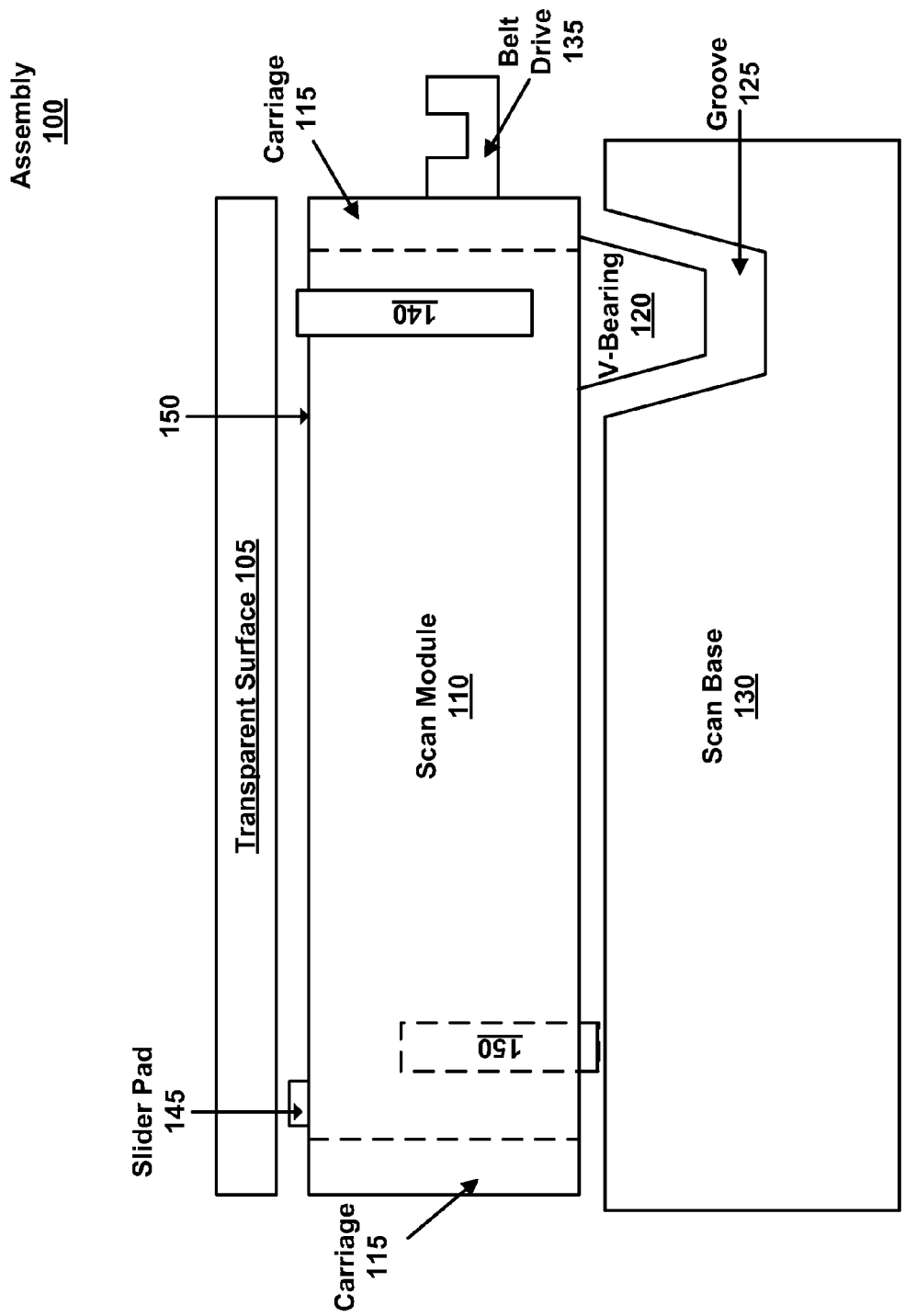
FIG. 1 illustrates a scan assembly in accordance with embodiments of the present technology.

The drawings referred to in this description of embodiments should be understood as not being drawn to scale except if specifically noted.

DESCRIPTION OF EMBODIMENTS

Reference will now be made in detail to various embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview of Discussion

Embodiments of the present technology comprise scanner assemblies. In one embodiment, a scanner assembly has a hardware component known as a carriage which encompasses the scan module and moves the scan module along a transparent surface. In one embodiment, the scan module has a length parallel to the transparent surface and a thickness perpendicular to the transparent surface. The carriage may be constructed in such a way that the carriage encompasses or surrounds the scan module, but is no thicker than the scan module in a direction perpendicular to the transparent surface. In this manner, a scanner assembly can be built with a minimal overall height or thickness. For example, in an embodiment with a scan module that is 6.5 mm thick, a scanner assembly may be built with an enclosure that is less than 12.5 mm from the top of the transparent surface to the bottom of the enclosure of the scanner assembly.

In one embodiment, the carriage moves the scan module along the transparent surface by a belt drive thus sweeping the scan module across a document. In one embodiment, the scan module moves along the transparent surface using two wheels attached to the scan module at one end of the scan module and a slider pad attached on the other end of the scan module. In one embodiment, the carriage moves relative to a scan base using a v-bearing protruding from the carriage at one end which fits into a groove of the scan base and a wheel attached to the carriage at the other end. In one embodiment, the scan base has a protruding v-bearing and the carriage has a groove to fit the v-bearing. In one embodiment, the scan module has four tangs protruding from it and each tang is in contact with a spring, two springs on one end of the scan module and two springs on the other. The springs are also in contact with the carriage. The four springs serve to bias the scan module against the transparent surface and bias the v-bearing of the carriage against the groove in the scan base.

In one embodiment, the scan module is housed or contained by the carriage using a datum pin attached to and protruding from the carriage and a datum screw. The scan module may have two slots on opposite ends of the scan module, one for receiving the datum pin and one for receiving the datum screw. In such an embodiment, the datum pin and the datum screw serve to connect the scan module to the carriage while allowing the scan module to move in three degrees of freedom relative to the carriage.

A scan module may have a variety of components that are connected and situated in a variety of positions. Typically, a scan module will have an array of sensors for sensing an image. The array of sensors may be mounted in such a way as to receive light reflected off an image or document, the light passes through the transparent surface, through a lens, and onto or into the sensor array. Scanners may be built with the transparent surface above the lens which is above the sensor array. Scanners built in this manner must comprise a housing that allows for the thickness of the lens above the sensor array.

In one embodiment of the present technology, the sensor array is mounted in the scan module oriented to receive light that is moving in a direction parallel to the transparent surface. However, light reflected from a document or image that passes through the transparent surface will be moving in directions not parallel to the transparent surface and will not be detected by the sensor array mounted in this embodiment. To solve this problem, a mirror is mounted in the scan module and configured to receive the light that passes through the transparent surface and reflect the light in a different direction. The light then passes through a plurality of lenses which focuses the light onto the array of sensors mounted to receive light traveling parallel to the transparent surface.

The mirror enables the scanner assembly to be with a minimum thickness or height. The mirror allows for the lens to be placed to the side of the mirror and the sensor array placed to the side of the mirror. Thus the overall height of the scanner assembly may be reduced.

Embodiments of a Scanner Assembly

Embodiments of the present technology propose scanner assemblies. Such scanner assemblies may be built or manufactured with a minimum overall height or thickness using techniques and parts that are more inexpensive compared to prior solutions.

With reference now to FIG. 1, a block diagram of a cross section view of a scanner assembly, in accordance with embodiments of the present technology. Assembly 100 includes transparent surface 105, scan module 110, carriage 115, v-bearings 120, groove 125, scan base 130, belt drive 135, wheel 140, slider pad 145, and wheel 150. Assembly 100 should not be construed to limit the present technology. It should be appreciated that assembly 100 may contain some or all of the components described in FIG. 1.

In one embodiment, transparent surface 105 is a component of a scanner assembly. Transparent surface 105 may have a thickness and is configured to allow light to pass through its thickness without significant distortion to the light. A two dimensional document or other image to be scanned may be placed on transparent surface 105 such that the document or image is parallel to transparent surface 105. The surface of transparent surface 105 may be uniformly even or may have curves or errors in the surface. It should be appreciated that transparent surface 105 may be composed of a variety of materials including, but not limited to, plastic, polymers and glass.

In one embodiment, scan module 110 is a component of a scanner assembly that is configured to receive light reflected from a document, image or other object to be scanned. In one embodiment, scan module 110 has a length that is parallel to transparent surface 105 and a thickness that is perpendicular to transparent surface 105. In one embodiment, scan module 110 has a first surface 150 that is parallel to transparent surface 105. Scan module 110 may have a variety of components designed to receive such light. In one embodiment, scan module 110 receives only a portion of light reflected from an object to be scanned at any one time. In one embodiment, scan module 110 is not capable of scanning an entire object while remaining in one position. Thus, in one embodiment, scan module 110 moves relative to transparent surface 105 to scan the entire object.

To easily move scan module 110 along transparent surface 105, scan module 110 may comprise wheel 140 and slider pad 145. In one embodiment, wheel 140 is a wheel designed to rotate about an axis and may be composed of a variety of materials including plastic or metal. Thus wheel 140 may rotate about an axis that is fixed or attached to scan module 110. In one embodiment, wheel 140 is positioned in a manner that allows scan module 110 to move in a desired direction relative to transparent surface 105. In one embodiment, slider pad 145 is fixed to scan module 110 and is composed of a material that has a low coefficient of friction relative to transparent surface 105. Thus wheel 140 and slider pad 145 allow scan module 110 to move back and forth along a surface of transparent surface 105. In one embodiment, wheel 140 and slider pad 145 protrude from the top surface of scan module 110 and thus prevent the main body of scan module 110 from contacting transparent surface 105. In one embodiment, wheel 140 is positioned at one end of scan module 110 such that it will be above v-bearings 120 of carriage 115 while slider pad 145 is positioned at an opposite end of scan module 110. In one embodiment, scan module 110 comprises two wheels in line with each other.

In one embodiment, carriage 115 is a component of a scanner assembly. Carriage 115 may be configured to encompass the length and width of scan module 110 while leaving the top and bottom surfaces of scan module 110 exposed. In one embodiment, the top surface, or first surface, of scan module 110 must be exposed by carriage 115 such that scan module 110 may receive light reflected from the object to be scanned. The present technology allows for the carriage to be made of material molded with less process tolerance and hence a lower cost. The lesser degree of tolerance is overcome by techniques that will be described which bias the scan module against the transparent surface.

In one embodiment, carriage 115 has a thickness that is perpendicular to transparent surface 105 wherein the thickness of carriage 115 is no greater than the thickness of scan module 110 in a direction parallel to transparent surface 105. By allowing the thickness of carriage 115 to be no greater than the thickness of scan module 110, a minimum overall height of assembly 100 is ensured. In various embodiments, the thickness of carriage 115 may be slightly thicker or thinner than scan module 110 and achieve the same overall height of the scanner assembly. It should be appreciated that that carriage 115 may be made of a variety of materials or combination of materials including plastic and metal.

One purpose of carriage 115 is to move or drive scan module 110 along transparent surface 105. Therefore, carriage 115 must be able to move relative to scan base 130 and transparent surface 105. In one embodiment, carriage 115 includes v-bearings 120 which comprise two in-line protrusions from the bottom surface of carriage 115. A v-bearing is a protrusion from the carriage that is shaped in a V with the pointed end of the V pointing away from the carriage. Both sides of the V having a material used to slide along a groove shaped to receive the v-bearing. Such a material may be a lubricating material, grease, a Teflon sleeve, a bearing, or other friction reducing material. In other words, v-bearings 120 protrude downward from transparent surface 105 and towards scan base 130. In one embodiment, v-bearings 120 are configured to be received by groove 125 in scan base 130. In one embodiment, groove 125 and v-bearings 120 have a length in a direction that allows v-bearings 120 to move back and forth in one dimension in groove 125. In such an embodiment, carriage 115 and scan module 110 would also only move in one dimension back and forth relative to transparent surface 105.

In one embodiment, v-bearings 120 are positioned proximate to one end of carriage 115. In one embodiment, carriage 115 also comprises wheel 150 proximate to an opposite end of carriage 115 from v-bearings 120. In one embodiment, wheel 150 has an axis attached to carriage 115 and is permitted to move rotate about the axis. In one embodiment, wheel 150 contacts a surface of scan base 130 and thus allows carriage 115 to easily move relative to scan base 130. In one embodiment, carriage 115 comprises two wheels in line with each other.

In one embodiment, carriage 115 is coupled with or includes belt drive 135. Belt drive 135 is designed to move carriage 115 relative to transparent surface 105 and scan base 130 in one dimension. In one embodiment, belt drive 135 includes a drive motor. In one embodiment, the drive motor is attached to scan base 130 and belt drive 135 is simply attached to a belt. Belt drive 135 may be a belt drive that is well known in the art such as a belt drive with a rubber or plastic belt. The use of a belt drive in assembly 100 may reduce the cost of assembly 100.

Figure 2:
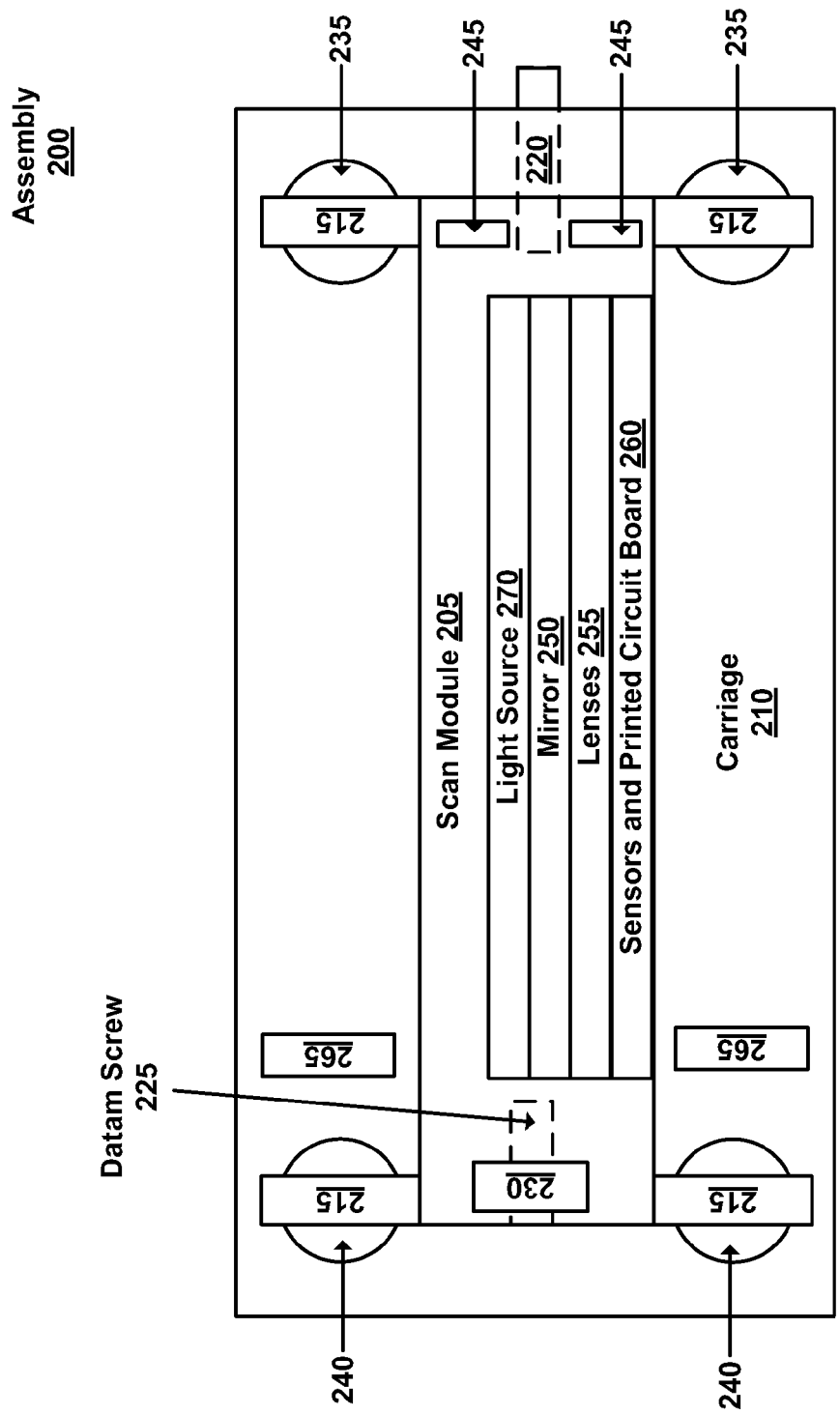
FIG. 2 illustrates a scan assembly in accordance with embodiments of the present technology.

With reference now to FIG. 2, a block diagram of a top view of a scanner assembly, in accordance with embodiments of the present technology. Assembly 200 includes scan module 205, carriage 210, four tangs 215, datum pin 220, datum screw 225, slider pad 230, first set of two springs 235, second set of two springs 240, wheels 245, mirror 250, lens 255, printed circuit board 260, wheels 265 and light source 270. Assembly 200 should not be construed to limit the present technology. It should be appreciated that assembly 200 may contain some or all of the components described in FIG. 2. FIG. 2 may be thought of as a view of assembly 100 of FIG. 1 that is looking through transparent surface 105.

In one embodiment, assembly 200 comprises scan module 205 and carriage 210 which have all the same capabilities and functions of scan module 110 and carriage 115 of FIG. 1. Mirror 250, lens 255, printed circuit board 260 and light source 270 are all components of scan module 205. In one embodiment, scan module 205 comprises four tangs 215. Four tangs 215 protrude in an outward direction from scan module 205 over a portion of carriage 210. In one embodiment, the length of four tangs 215 is parallel to transparent surface 105 of FIG. 1.

In one embodiment, there is a spring between each of four tangs 215 and carriage 210. The springs may be attached to or only in contact with either a tang of four tangs 215 or carriage 210. In one embodiment, first set of two springs 235 are positioned proximate to one end of scan module 205 and carriage 210 such that first set of two springs 235 are above v-bearings 120 of FIG. 1. In one embodiment, second set of two springs 240 are positioned proximate to an opposite end of scan module 205 and carriage 210 of first set of two springs 235. Both first set of two springs 235 and second set of two springs 240 may serve to bias scan module 205 against transparent surface 105 of FIG. 1. Thus as scan module 205 moves along a transparent surface, it will maintain a uniform distance from the transparent surface. Biasing scan module 205 against the transparent surface overcomes the problems of a transparent surface that has a small amount of curvature or other error that causes the transparent surface 105 to not be uniformly even.

For example, a transparent surface may be warped so that the surface is uneven within a range of 0.3 mm. Therefore, if an object to be scanned is placed in contact with the transparent surface, the scan module 205 will maintain a uniform distance from the object as it moves along the transparent surface scanning the object despite curvature and warping of the transparent surface. Allowing for a transparent surface that has a small amount of curvature or other error reduces the cost in manufacturing the transparent surface and thus reduces the overall cost of the scanner assembly. Additionally, the scan module 205 may be warped or curved. Biasing the scan module 205 against the transparent surface with the springs will also overcome errors that may occur when scan module 205 is warped or curved.

In one embodiment, first set of two springs 235 also serve to bias v-bearings 120 of carriage 115 into groove 125. In one embodiment, first set of two springs 235 exert a stronger force than second set of two springs 240 because first set of two springs 235 may be required to bias both the scan module and the carriage respectively. Therefore a higher force will be exerted on v-bearings and wheels which touch the transparent surface while a lighter force will be exerted on wheels which touch the scan base and slider pads which touch the transparent surface. In one embodiment, first set of two springs 235 exert a force of approximately 300 g and second set of two springs 240 exerts a force of approximately 40 g.

In one embodiment, wheels 245 serve the same purpose as wheel 140 of FIG. 1 to easily move scan module 205 along a transparent surface. In one embodiment, wheels 265 service the same purpose as wheel 150 of FIG. 1, to move carriage 210 along a scan base.

In one embodiment, scan module 205 comprises mirror 250. Mirror 250 serves to receive light reflected from an object being scanned. In one embodiment, light source 270 transmits a linear light source onto the object being scanned. The light from light source 270 is reflected off of the object, passes through the transparent surface, and is reflected by mirror 250. The light may be traveling substantially perpendicular to the transparent surface. In one embodiment, mirror 250 reflects the light that passes through the transparent surface by ninety degrees. In one embodiment, after the light is reflected by mirror 250, it passes through lenses 255 which are configured to focus the light on the surface of a sensor. Lenses 255 may comprise a single lens or a plurality of lenses. In one embodiment, lenses 255 are lens-lets. After passing through the lenses 255, the light is received by an array of sensors housed on printed circuit board 260. Such sensors may be sensors typically used in the art for scanning documents and other objects. Such an embodiment with mirror 250 allows for a printed circuit board 260 to be positioned vertically relative to the transparent surface. This configuration allows for a scanner assembly to be manufactured with a minimum height.

In one embodiment, mirror 250, lens 255, sensors, printed circuit board 260, and light source 270 are all disposed in the scanner assembly side by side directly below the transparent surface. Such a configuration is different from other scanner assemblies because these components are not stacked one on top of the other. In other words, these components are side by side in a horizontal arrangement beneath the transparent surface such that no component is placed between one of these components and the transparent surface. In one embodiment, the printed circuit board 260 is substantially vertical meaning that its length is perpendicular to the transparent surface.

In one embodiment, carriage 210 comprises datum pin 220 which is a protrusion from carriage 210 proximate to one end of carriage 210. In one embodiment, datum pin 220 is located on an end of carriage 210 opposite v-bearings 120 and on the same end as slider pad 230 of scan module 205. In one embodiment, scan module 205 comprises a first slot to receive datum pin 220. Such a slot may simply be a hole or groove or some other type of opening designed to receive datum pin 220. In one embodiment, carriage 210 comprises a hole at an end opposite of datum pin 220. Scan module 205 may then comprises a second slot at an end of scan module 205 opposite of the first slot. The second slot of scan module 205 is positioned to be in line with the hole of carriage 210. In one embodiment, datum screw 225 is inserted into the hole of carriage 210 and the second slot of scan module 205. FIG. 2 is drawn to depict datum pin 220 of carriage 210 inserted into the first slot of scan module 205 and datum screw 225 inserted into the hole of carriage 210 and the second slot of scan module 205. FIG. two also depicts datum pin 220 and datum screw 225 each having a length or axes that are in line with one another.

In one embodiment, datum pin 220 and datum screw 225 are inserted into their respective slots in a manner that allows for scan module 205 to have three degrees of movement relative to carriage 210. When datum pin 220 and datum screw 225 have axes that are in line with one another, scan module 205 is permitted to move about those axes relative to carriage 210 thus defining one degree of movement. A second degree of movement is defined by scan module 205 rotating about an axis wherein the axis is perpendicular to the axes that run through datum pin 220 and datum screw 225. This second degree of movement all one end of scan module 205 to be raised and the opposite end lowered relative to carriage 210. A third degree of movement is defined by scan module 205 moving up and down relative to carriage 210 or in other words towards or away from the transparent surface. Such movement may be accomplished via pressure exerted from first set of two springs 235 and second set of two springs 240 and allows the scan module 205 to move along the transparent surface in a uniform fashion despite curvature and warping of the transparent surface. This solution is especially useful when the transparent surface and the surface upon which the carriage rides are not co-planar. In one sense, the datum pin and datum screw allow the scan module to be gimbaled within the carriage.

In one embodiment, the scanner is assembled during the manufacturing process using an assembly fixture. During the assembly process, in one embodiment, the carriage is placed in the assembly fixture and claimed into position. Next the first slot of the scan module is inserted into the datum pin of the carriage. Then a temporary shim is placed between the carriage and the scan module at the data pin such that the scan module will have limited movement side so side along the datum pin once the shim is removed. Then the second slot of the scan module is aligned with the slot of the carriage and a data screw is inserted into and through the two slots. The shim is then removed. The carriage is then unclamped from the scanner assembly. Thus the scan module and the carriage are attached using the datum pin and datum screw while allowing the scan module three degrees of movement relative to the carriage. In one embodiment, the datum screw can be set to a precise prescribed value to allow for prescribed movement of the scan module.

Figure 3:
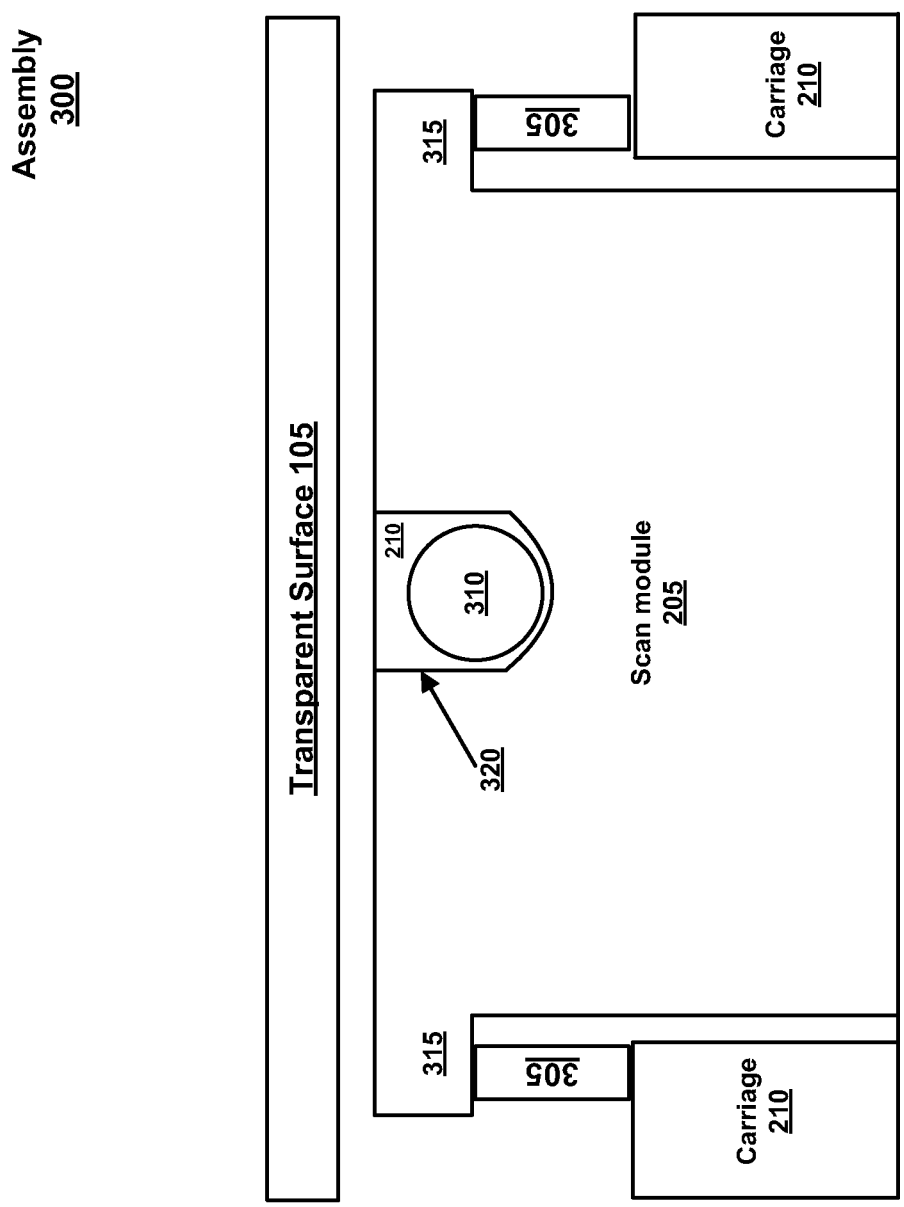
FIG. 3 illustrates a scan assembly in accordance with embodiments of the present technology.

With reference now to FIG. 3, a block diagram of a cross section view of portions of a scanner assembly, in accordance with embodiments of the present technology. Assembly 300 includes transparent surface 105, scan module 205, carriage 210, springs 305, hole 310, tangs 315, and slot 320. Assembly 300 should not be construed to limit the present technology. It should be appreciated that assembly 300 may contain some or all of the components described in FIGS. 1 and 2.

FIG. 3 is drawn such that assembly 300 may be a view of either the fixed end or the free end of the scanner assembly. In one embodiment, springs 305 may be depicting either first set of two springs 235 or second set of two springs 240. In one embodiment, slot 320 may be depicting either the first or second slot of scan module 205. Slot 320 is open on the top portion, the line above slot 320 in FIG. 3 depicts a portion of carriage 210. In one embodiment, hole 310 is a hole in carriage 210 configured to receive a datum screw. FIG. 3 depicts how springs 305 may be used to bias scan module 205 against transparent surface 105 by contacting and exerting pressure upon bother tangs 315 and carriage 210.

Embodiments of the present technology also allow for a rework of the assembly even after its initial assembly. This may easily be accomplished by removing or adjusting the datum screw. Thus time and expense may be saved in repairing or replacing components of scanner assembly in accordance with the present technology.

What is claimed is:

1. A scanner assembly comprising:
   a scan module having a first surface and configured to receive an image oriented along said first surface;
   a carriage having a thickness no thicker than a thickness of said scan module perpendicular to said first surface, said carriage configured to receive said scan module and to move said scan module in a direction of travel;
   a v-bearing coupled to said carriage proximate to one end of said carriage and protruding from said carriage in a direction perpendicular to said first surface;
   a scan base having a groove and configured to receive said v-bearing;
   a belt drive configured to move said v-bearing in said groove of said scan base; and
   a plurality of tangs extending out of said scan module configured to contact a plurality of springs, wherein said plurality of springs contact said carriage.

2. The scanner assembly of claim 1, said scan module further having a length with a first end and a second end, and further comprising:
   a slider pad attached to said first end configured to slide along a transparent surface; and
   two wheels attached to said second end configured to roll along said transparent surface.

3. The scanner assembly of claim 1, wherein said carriage further comprises:
   a wheel attached to said carriage coupled to said carriage at an opposite of said end of carriage from said v-bearing and configured to allow said carriage to move relative to said scan base.

4. The scanner assembly of claim 1, wherein said plurality of tangs is four tangs and wherein said plurality of springs is four springs carriage.

5. The scanner assembly of claim 1, further comprising:
   a first set of two springs in contact with said carriage above said v-bearing configured to bias said scan module against a transparent surface and to bias said v-bearing against said groove of said scan base; and
   a second set of two springs in contact with said carriage at an opposite end of said carriage from said v-bearing and configured to bias said scan module against said transparent surface and to bias two wheels attached to said carriage against said scan base.

6. The scanner assembly of claim 1, further comprising:
   a datum pin protruding from said carriage proximate to one end of said carriage and a hole in said carriage at an opposite end of said carriage from said datum pin;
   a first slot in said scan module proximate to one end of said scan module and further configured to receive said datum pin of said carriage;
   a second slot in said scan module at an opposite end of said first slot of said scan module configured to align with said hole of said carriage;
   a datum screw configured to be inserted through said second slot of said scan module and said hole of said carriage, wherein said datum screw is adjustable; and
   wherein said datum pin and said datum screw are configured to attach said scan module to said carriage and configured to allow said scan module three degrees of movement relative to said carriage.

7. A scanner assembly comprising:
   a scan module comprising a first surface and configured to receive an image oriented along said first surface, said scan module further comprising:
      a mirror configured to reflect light from said image;
      a plurality of lenses configured to focus said light reflected from said mirror; and
      an array of sensors coupled to a surface of a printed circuit board and configured to receive light focused from said plurality of lenses wherein said mirror, said plurality of lenses, said array of sensors and said printed circuit board are disposed in said scanner assembly side by side such that each are below a transparent surface;
   a carriage having a thickness no thicker than a thickness of said scan module, said carriage configured to receive said scan module and to move said scan module in a direction of travel; and
   a first set of springs in contact with said carriage above said v-bearing configured to contact said scan module and bias said scan module against a transparent surface and further configured to bias said v-bearing engaged in said groove of said scan base; and a second set of springs in contact with said carriage at an opposite end of said carriage from said v-bearing and configured to contact said scan module and bias said scan module against said transparent surface and to bias two wheels attached to said carriage against said scan base.

8. The scanner assembly of claim 7, further comprising:
a v-bearing coupled to said carriage proximate to one end of said carriage and protruding from said carriage in a direction perpendicular to said first surface;
a scan base having a groove and configured to receive said v-bearing; and
a belt drive configured to move said v-bearing in said groove of said scan base.

9. The scanner assembly of claim 7 wherein said first set of springs is two springs and said second set of springs is two springs.

10. The scanner assembly of claim 7, said scan module further having a length with a first end and a second end, and further comprising:
a slider pad attached to said first end configured to slide along a transparent surface wherein said transparent surface is parallel to said first surface; and
two wheels attached to said second end configured to roll along said transparent surface.

11. The scanner assembly of claim 7, wherein said carriage further comprises:
at least one wheel attached to said carriage coupled to said carriage at an opposite of said end of said v-bearing and configured to allow said carriage to move relative to said scan base.

12. The scanner assembly of claim 7, wherein said scan module further comprises:
four tangs extending out of said scan module configured to contact four springs, wherein said four springs contact also contact said carriage.

13. The scanner assembly of claim 7, further comprising:
a datum pin protruding from said carriage proximate to one end of said carriage and a hole in said carriage at an opposite end of said carriage from said datum pin;
a first slot in said scan module proximate to one end of said scan module and further configured to receive said datum pin of said carriage;
a second slot in said scan module at an opposite end of said first slot of said scan module configured to align with said hole of said carriage;
a datum screw configured to be inserted through said second slot of said scan module and said hole of said carriage, wherein said datum screw is adjustable; and
wherein said datum pin and said datum screw are configured to attach said scan module to said carriage and configured to allow said scan module three degrees of movement relative to said carriage.

14. A scanner assembly comprising:
a scan module having a first surface, a first slot parallel to and below said first surface at a first end of said scan module, a second slot parallel to and below said first surface at a second end of said scan module and configured to receive an object oriented along said first surface;
a carriage having a thickness no thicker than a thickness of said scan module perpendicular to said first surface, said carriage configured to receive said scan module and to move said scan module in a direction of travel and said carriage having a datum pin protruding from said carriage configured to be received by said second slot of said scan module and said carriage having a first slot configured to be in line with said first slot of said scan module;
a datum screw configured to be received by said first slot of said scan module and said first slot of said carriage such that said scan module is allowed three degrees of freedom of movement relative to said carriage.

15. The scanner assembly of claim 14, wherein said scan module further comprises:
a light source configured to transmit light onto said object;
a mirror configured to receive light from said object reflected in a perpendicular direction to said first surface and reflect said light in a different direction;
a plurality of lenses configured to receive light reflected from said mirror and focus said light in a direction parallel to said first surface of said scan module; and
a printed circuit board having a vertical surface perpendicular to said first surface of said scan module.

16. The scanner assembly of claim 14, further comprising:
a v-bearing coupled to said carriage proximate to one end of said carriage and protruding from said carriage in a direction perpendicular to said first surface;
a scan base having a groove and configured to receive said v-bearing; and
a belt drive configured to move said v-bearing in said groove of said scan base.

17. The scanner assembly of claim 16, further comprising:
a first set of two springs in contact with said carriage above said v-bearing configured to contact said scan module and bias said scan module against a transparent surface and further configured to bias said v-bearing against said groove of said scan base; and
a second set of two springs in contact with said carriage at an opposite end of said carriage from said v-bearing and configured to contact said scan module and bias said scan module against said transparent surface and to bias two wheels attached to said carriage against said scan base.

18. The scanner assembly of claim 14, said scan module further having a length with a first end and a second end, and further comprising:
a slider pad attached to said first end configured to slide along a transparent surface wherein said transparent surface is parallel to said first surface; and
two wheels attached to said second end configured to roll along said transparent surface.

19. The scanner assembly of claim 14, wherein said carriage further comprises:
at least one wheel attached to said carriage coupled to said carriage at an opposite of said end of said v-bearing and configured to allow said carriage to move relative to said scan base.

20. The scanner assembly of claim 14, wherein said scan module further comprises:
four tangs extending out of said scan module configured to contact four springs, wherein said four springs contact also contact said carriage.

* * * * *